US012429359B2

(12) United States Patent
Davis

(10) Patent No.: US 12,429,359 B2
(45) Date of Patent: Sep. 30, 2025

(54) SENSOR SYSTEM AND A METHOD OF TEMPERATURE-COMPENSATION THEREOF

(71) Applicant: DANA AUTOMOTIVE SYSTEMS GROUP, LLC, Maumee, OH (US)

(72) Inventor: Justin S. Davis, Maumee, OH (US)

(73) Assignee: DANA AUTOMOTIVE SYSTEMS GROUP, LLC, Maumee, OH (US)

(*) Notice: Subject to any disclaimer, the term of this patent is extended or adjusted under 35 U.S.C. 154(b) by 382 days.

(21) Appl. No.: 17/595,309

(22) PCT Filed: May 15, 2019

(86) PCT No.: PCT/US2019/032383
§ 371 (c)(1),
(2) Date: Nov. 12, 2021

(87) PCT Pub. No.: WO2020/231420
PCT Pub. Date: Nov. 19, 2020

(65) Prior Publication Data
US 2022/0221307 A1    Jul. 14, 2022

(51) Int. Cl.
*G01D 3/036* (2006.01)
*G01D 5/20* (2006.01)

(52) U.S. Cl.
CPC ......... *G01D 3/0365* (2013.01); *G01D 5/2013* (2013.01)

(58) Field of Classification Search
CPC ............ G01D 3/0365; G01D 5/2013
See application file for complete search history.

(56) References Cited

U.S. PATENT DOCUMENTS

| 4,875,007 A | * | 10/1989 | Ginns | G01B 7/023 |
| | | | | 324/227 |
| 5,541,510 A | * | 7/1996 | Danielson | G01B 7/10 |
| | | | | 324/207.16 |
| 6,501,261 B2 | | 12/2002 | Muth | |

(Continued)

FOREIGN PATENT DOCUMENTS

| DE | 102007062862 | * | 7/2008 | ............... G01B 7/14 |
| DE | 102007062862 A1 | | 7/2008 | |

(Continued)

OTHER PUBLICATIONS

ISA European Patent Office, International Search Report and Written Opinion Issued in Application No. PCT/US2019/032383, Feb. 17, 2020, WIPO, 13 pages.

(Continued)

*Primary Examiner* — Lisa M Caputo
*Assistant Examiner* — Sharah Zaab
(74) *Attorney, Agent, or Firm* — McCoy Russell LLP

(57) ABSTRACT

A sensor system includes a first sensor, a second sensor, and a control in electrical communication with the first and second sensors. The controller includes a memory for storing data configured to store an offset profile for the at least one output of the first sensor. The offset profile includes a plurality of offset values, which is calculated using measured outputs of the first sensor determined while a position of a conductive material is maintained and a temperature of surrounding atmosphere is varied.

14 Claims, 7 Drawing Sheets

(56) References Cited

U.S. PATENT DOCUMENTS

| | | | | |
|---|---|---|---|---|
| 7,384,359 | B2* | 6/2008 | Pinkos | F16H 48/08 |
| | | | | 192/30 W |
| 7,602,271 | B2 | 10/2009 | York et al. | |
| 8,156,843 | B2* | 4/2012 | Povirk | F16H 48/30 |
| | | | | 475/249 |
| 9,804,249 | B2 | 10/2017 | Petrie et al. | |
| 2007/0142157 | A1* | 6/2007 | Nofzinger | F16H 48/34 |
| | | | | 475/231 |
| 2015/0118766 | A1* | 4/2015 | Xu | B24B 49/105 |
| | | | | 438/10 |
| 2016/0231277 | A1* | 8/2016 | Molenda | G01N 27/72 |

FOREIGN PATENT DOCUMENTS

| | | | | |
|---|---|---|---|---|
| EP | 0136238 | A1 | 4/1985 | |
| FR | 0136238 | * | 4/1985 | B23K 9/127 |
| GB | 2197957 | * | 6/1988 | G01D 3/02 |
| WO | 9721070 | A1 | 6/1997 | |
| WO | WO9721070 | * | 6/1997 | G01B 7/02 |

OTHER PUBLICATIONS

China National Intellectual Property Administration, Office Action and Search Report Issued in Application No. 201980096438.5, Jul. 17, 2024, 18 pages.

* cited by examiner

SENSOR SYSTEM AND A METHOD OF TEMPERATURE-COMPENSATION THEREOF

CROSS-REFERENCE TO RELATED APPLICATION

The present application is a U.S. National Phase of International Application No. PCT/US2019/032383, entitled "SENSOR SYSTEM AND A METHOD OF TEMPERATURE-COMPENSATION THEREOF", and filed on May 15, 2019. The entire contents of the above-listed application is hereby incorporated by reference for all purposes.

TECHNICAL FIELD

The presently disclosed subject matter relates to a sensor system, and more particularly to a sensor system and a method of temperature-compensation thereof.

BACKGROUND AND SUMMARY

An electrical differential locker (EDL) is an actuator which controls operation of a differential. The differential improves traction of a vehicle by providing equal torque to each wheel disposed at ends of an axle assembly thereof. It is known to position the EDL in an engaged state using an electromagnetic solenoid. The electromagnetic solenoid actuates a plunger, which in turn, moves a locking gear disposed within the differential. A sensor may be used to measure an engagement and a disengagement of the locking gear with the differential. Oftentimes, the sensor measures the engagement and disengagement of the locking gear by sensing an axial position of the locking gear.

One such type of sensor is an eddy current sensor. The eddy current 'Sensor uses an inductive wire coil to generate a high-frequency alternating magnetic field. If a conductive material (e.g. the locking gear) is in close proximity to the eddy current sensor, eddy currents will form within the conductive material. These eddy currents create an opposing magnetic field to the magnetic field of the wire coil. An amplitude of the opposing magnetic field is proportional to a distance of the locking gear from the wire coil. A net effect is a decrease in an apparent inductance of the wire coil proportional to the distance of the locking gear from the wire coil. The inductance of the wire coil is measured in the eddy current sensor. A microcontroller uses the measured inductance to calculate the distance of the locking gear from the wire coil.

It would be desirable to produce a sensor system and a method of temperature-compensation thereof, which enhances accuracy and efficiency of the sensor system.

SUMMARY

In concordance and agreement with the present disclosure, a sensor system and a method of temperature-compensation thereof, which enhances accuracy and efficiency of the sensor system, has surprisingly been discovered.

In one embodiment, a sensor system, comprises: a first sensor configured to generate at least one output; and a controller in electrical communication with the first sensor, the controller including a memory for storing data configured to store at least one offset value for the at least one output of the first sensor.

As aspects of certain embodiments, the first sensor is an eddy current sensor.

As aspects of certain embodiments, the at least one output of the first sensor is indicative of a distance of a conductive material from the first sensor.

As aspects of certain embodiments, the at least one output of the first sensor is a frequency signal.

As aspects of certain embodiments, the at least one offset value is a difference between at least one measured output of the first sensor and a predetermined output of the first sensor.

As aspects of certain embodiments, the at least one measured output of the first sensor is determined while a position of a conductive material is maintained and a temperature of surrounding atmosphere is varied.

As aspects of certain embodiments, the predetermined output of the first sensor is a frequency signal at an ideal ambient temperature.

As aspects of certain embodiments, further comprising a second sensor in electrical communication with the controller, wherein the second sensor is configured to measure a temperature of a desired input location.

As aspects of certain embodiments, the second sensor is a thermistor.

In another embodiment, a method of temperature-compensation of a sensor system, comprises the steps of: providing a first sensor configured to generate an output; providing a controller in electrical communication with the first sensor, wherein the controller includes a memory for storing data; providing an offset profile stored in the memory of the controller, wherein the offset profile provides a plurality of offset values for the output of the first sensor; transmitting the output of the first sensor to the controller; and calculating a temperature-compensated output of the first sensor by adjusting the output of the first sensor by one of the offset values stored in the memory of the controller.

As aspects of certain embodiments, further comprising the step of providing a second sensor in electrical communication with the controller, wherein the second sensor is configured to measure a temperature of a desired input location.

As aspects of certain embodiments, the one of the offset values is obtained from the offset profile based upon the output of the first sensor and the measured temperature from the second sensor.

As aspects of certain embodiments, further comprising the step of comparing the temperature-compensated output of the first sensor to calibrated values the output of the first sensor to determine a state of a differential of a vehicle.

As aspects of certain embodiments, the offset values are calculated using measured outputs of the first sensor determined while a position of a conductive material is maintained and a temperature of surrounding atmosphere is varied.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
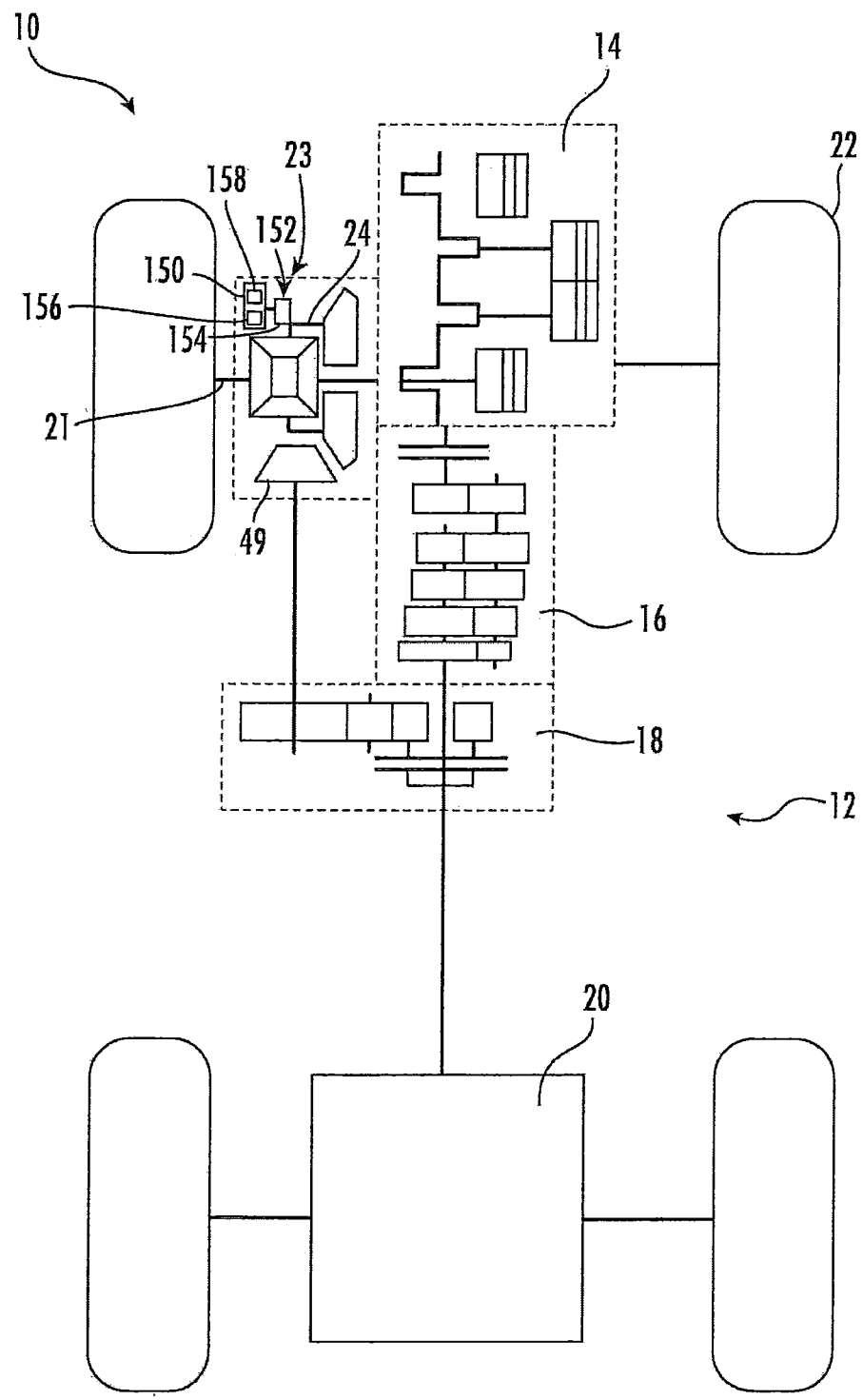
FIG. 1 schematically depicts a vehicle according to an embodiment of the presently disclosed subject matter.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 illustrates an all-wheel-drive (AWD) vehicle 10 according to the presently disclosed subject matter. The vehicle 10 may be any vehicle type as desired such as a conventional fuel-powered vehicle, an electric vehicle, and an electric-hybrid vehicle, for example. In one embodiment, the vehicle 10 may include a driveline arrangement 12 with a power source 14. The power source 14 may be, but is not limited to, an internal combustion engine or an electric motor. The driveline arrangement 12 may also include a transmission 16 having an input driveably connected to the power source 14 and an output driveably connected to a transfer case 18. The transfer case 18 including a first output continuously driveably connected to a rear drive unit 19 and a second output selectively driveably connected to a front drive unit 20. The rear drive unit 19 or the front drive unit 20 may further include an axle assembly 21 driveably connected to a wheel-set 22.

As illustrated in FIGS. 2-6, the axle assembly 21 includes a differential 23 having a differential case 24. The differential 23 provides improved fuel economy by disconnecting AWD driveline components when AWD functionality is not required. The differential case 24 is mounted for rotation within a differential carrier 10 via a pair of bearings 34, 36. In certain embodiments, the differential 23 may be utilized within the axle assembly 21 the vehicle 10 shown in FIG. 1. However, methods utilized with the differential 23 as disclosed herein may be also be utilized with other movable components. The methods may have applications in both light-duty and heavy-duty vehicles, and for passenger, commercial, and off-highway vehicles. Further, the methods may also have industrial, locomotive, military, agricultural, and aerospace applications, as well as applications in passenger, electric, and autonomous or semi-autonomous vehicles.

Figure 2:
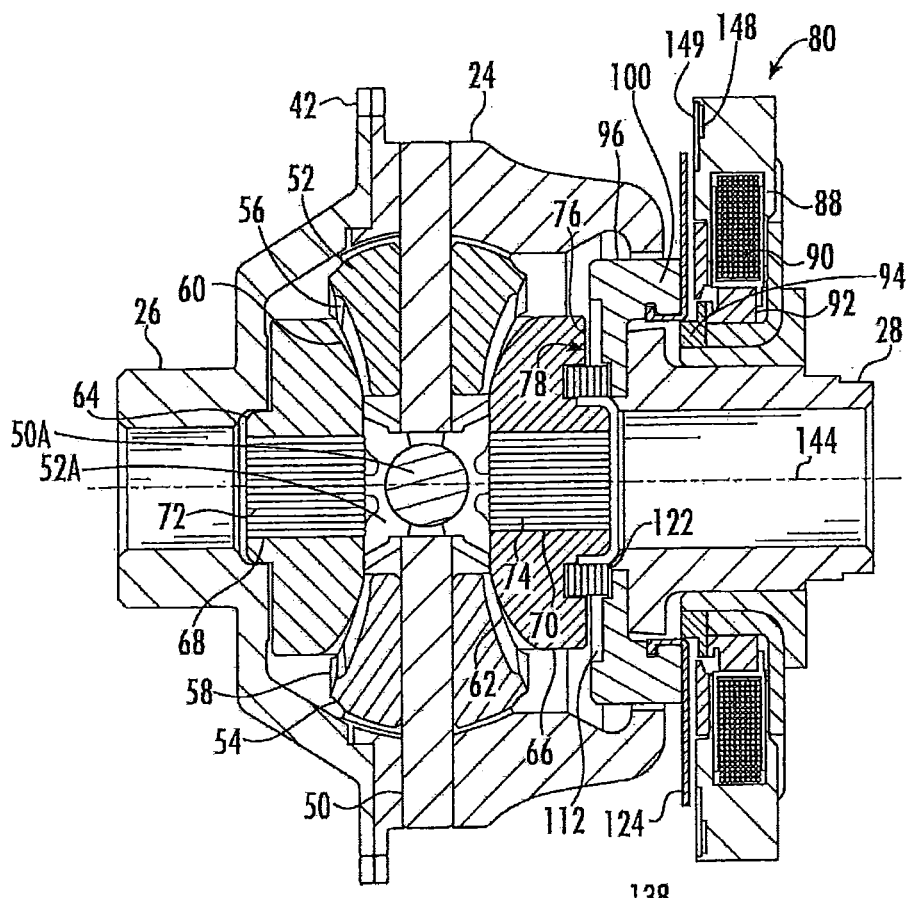
FIG. 2 is a cross-sectional view of a differential according to an embodiment of the presently disclosed subject matter.
Figure 5:
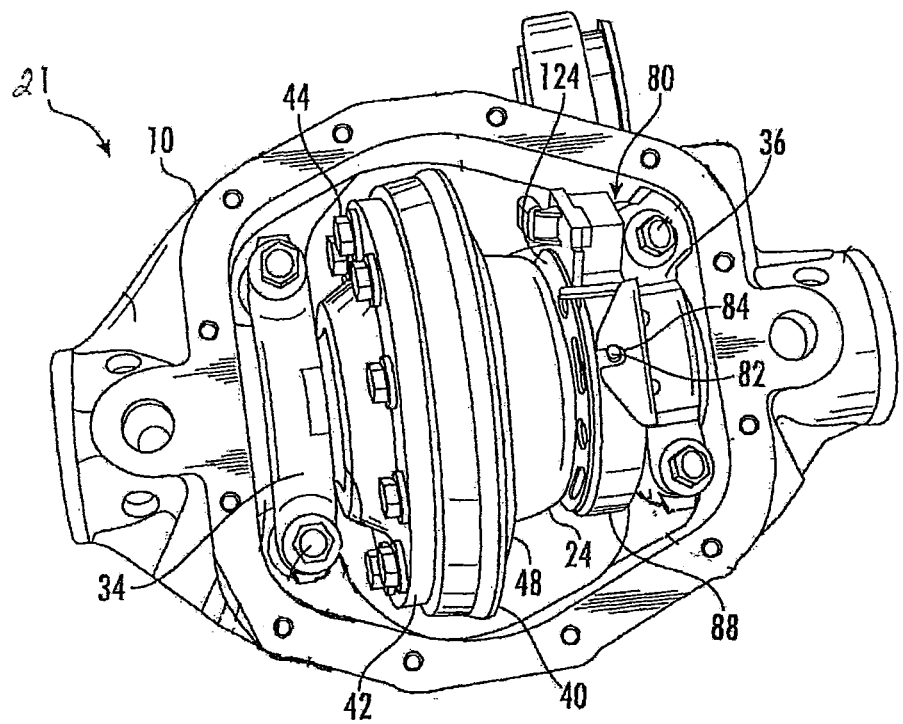
FIG. 5 is a perspective view of a portion of an axle assembly according to an embodiment of the presently disclosed subject matter, wherein a portion of a differential carrier is not shown.

As illustrated in FIG. 5, a ring gear 40 may be coupled with the differential case 24. In an embodiment, the ring gear 40 may be integrally formed with the differential case 24. In another embodiment, as illustrated in FIGS. 2 and 5, the differential case 24 may include a ring gear flange 42. The ring gear flange 42 may define a plurality of fastener apertures (not shown) disposed circumferentially thereabout and formed therethrough. Mechanical fasteners 44, such as bolts, may be disposed through the fastener apertures and into a first side of the ring gear 40 to couple the differential case 24 and the ring gear 40.

The ring gear 40 includes a plurality of teeth (not depicted) on a second side 48 of the ring gear 40. The ring gear teeth extend continuously circumferentially about the second side 48. The ring gear teeth mesh with a set of teeth on a pinion gear 49 shown in FIG. 1. The pinion gear 49 is coupled with the transfer case 18. The pinion gear 49 receives torque from the power source 14.

As illustrated in FIG. 2, in an embodiment, a pinion shaft 50 is disposed within the differential case 24. In an embodiment, additional pinion shafts 50A may be located at 90 degrees and transverse to the pinion shaft 50. The pinion shafts 50, 50A may also be referred to as spider shafts. The pinion shaft 50 is connected to the differential case 24. In an embodiment, the pinion shaft 50 may extend into the differential case 24 so that it is fixed therewith. Thus, the pinion shaft 50 rotates with the differential case 24.

A first differential pinion gear 52 is located on one end of the pinion shaft 50 and a second differential pinion gear 54 is located on the other end of the pinion shaft 50. The first and second differential pinion gears 52, 54 each include a plurality of teeth 56, 58 extending circumferentially about the first and second differential pinion gears 52, 54. As noted above, if additional pinion shafts 50A are provided, additional differential pinions may be located thereon. As illustrated in FIG. 2, a third differential pinion gear 52A is disposed on the additional pinion shaft 50A. The teeth 56, 58 of the first and second differential pinion gears 52, 54 are meshed with teeth 60, 62 on a first differential side gear 64 and a second differential side gear 66. The differential side gear teeth 60, 62 extend circumferentially about the first and second differential side gears 64, 66.

The first and second differential side gears 64, 66 include a hollow interior portion 68, 70, respectively. The hollow interior portions 68, 70 may each include radially extending splines 72, 74. The splines 72 of the first differential side gear 64 may be engaged with splines on a first axle half shaft (not depicted) to transfer rotation to the shaft. The splines 74 of the second differential side gear 66 may be engaged with splines on a second axle half shaft (not depicted) to transfer rotation to the shaft. The first and second axle half shafts extend from the differential case 24 and through the axle assembly 21 to the wheel-set 22.

In certain embodiments illustrated in FIGS. 2-4 and 6, the differential 23 may be an electrical differential locker (EDL). The EDL may be utilized in applications across multiple industries including automotive, aerospace, industrial automation equipment, and instrumentation applications. In one embodiment, the subject matter disclosed herein may be utilized in an operation 9f the AWD vehicle 10 shown in FIG. 1. In certain embodiments, the second differential side gear 66 may include a set of locking teeth 76 disposed on an axially outboard surface 78. In an embodiment, the locking teeth 76 are integrally formed with the second differential side gear 66. The locking teeth 76 extend circumferentially about the axially outboard surface 78.

As illustrated in FIGS. 2-6, an actuator assembly 80 may be mounted on the second differential case flange 28. The actuator assembly 80 is coupled with the differential carrier 10 so that the actuator assembly 80 is fixed against rotation relative to the differential carrier 10. In an embodiment, the actuator assembly 80 includes at least one radially extending pin 82. The pin 82 is received within a slotted flange 84 fixedly connected to the differential carrier 10. Receipt of the pin 82 within the slotted flange 84 militates against a rotation of the actuator assembly 80 with the differential case 24.

In an embodiment, the actuator assembly 80 comprises a solenoid actuator.' The actuator assembly 80 may include a housing 88, an electromagnetic coil 90, and an armature 92. In an embodiment, the housing 88 may have an annular geometry such that an inner diameter of the housing 88 is coupled with a sleeve 89. The sleeve 89 may be coupled with the differential case flange 28 such that the sleeve 89 may rotate relative to the differential case 24.

The electromagnetic coil 90 may be molded, or set, within a resin and disposed within the housing 88. The electromagnetic coil 90 may comprise a ring-shape with a hollow interior. The electromagnetic coil 90 is in electrical connection with a power source (not depicted), such as, but not limited to, a battery, that can selectively supply electricity to the electromagnetic coil 90. The power source may also be connected with a controller (not shown) that determines when electricity is supplied to the electromagnetic coil 90. In an embodiment, the controller may be mounted to an inboard portion of the housing 88. In another embodiment, the controller may be mounted to a radially outer surface of the actuator housing 88. In still another embodiment, the controller may be mounted to an outboard surface of the housing 88.

Figure 3:
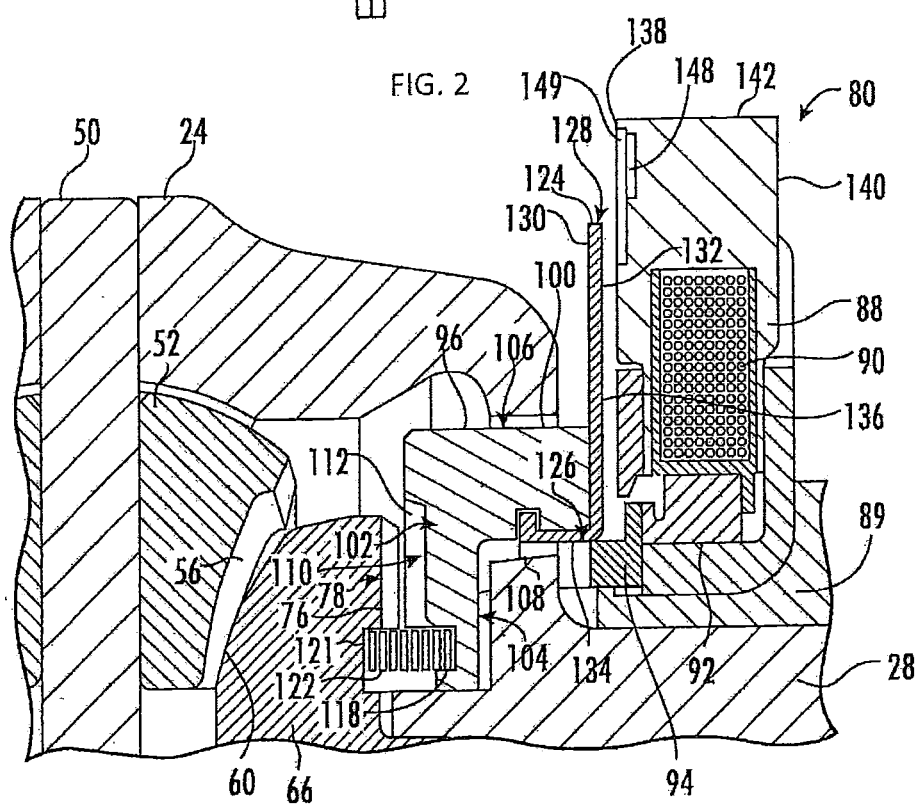
FIG. 3 is a fragmentary cross-sectional view of a portion of the differential according to FIG. 2, wherein the differential is in an unlocked state.
Figure 4:
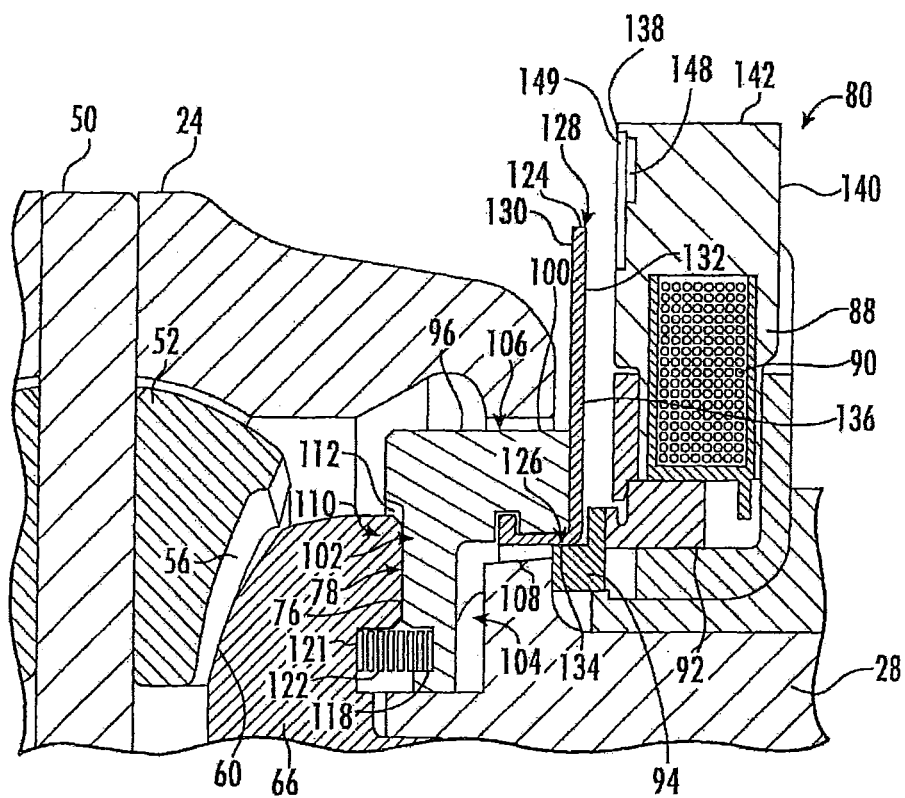
FIG. 4 is a fragmentary cross-sectional view of a portion of the differential according to FIG. 2, wherein the differential is in a locked state.

With reference to FIGS. 2-4, in an embodiment, the armature 92 may be a generally hollow-cylinder disposed radially inward from the electromagnetic coil 90. In some embodiments, at least a portion of the armature 92 is continuously radially surrounded by the electromagnetic coil 90. The armature 92 may be formed from a ferromagnetic material. Disposed axially adjacent to the armature 92, on an inboard side thereof, is an annular spacer 94. The annular spacer 94 may be formed from of a polymeric material.

When electricity is applied to the electromagnetic coil 90, the electromagnetic coil 90 generates a magnetic field which extends through the housing 88 and the armature 92. The magnetic field extends into the armature 92 causing the armature 92 to move in the axial direction. In an embodiment, the armature 92 does not rotate.

In an embodiment, as illustrated in FIGS. 2-4, a sensor plate 124 may be positioned axially adjacent to an inboard side of the spacer 94. The sensor plate 124 may also be disposed at least partially radially about the spacer 94. In an embodiment, the sensor plate 124 abuts a plurality of legs 100 of a locking gear 96. As more clearly illustrated in FIG. 6, the locking gear legs 100 extend axially outboard from a generally disk-shaped body portion 102 of the locking gear 96. The legs 100 are located on an axially outboard side 104 of the body portion 102. The locking gear body portion 102 includes a radially outer surface 106. The radially outermost surfaces of the legs 100 may extend from the outer surface 106 such that the outer surface 106 and the radially outermost surfaces of the legs 100 have the same outer diameter.

In an embodiment, the legs 100 may be circumferentially located such that they are separated from one another by arcs of the same length. The legs 100 may taper down from the body portion 102 to their ends. In an embodiment, the locking gear body portion 102 may be entirely located within the differential case 24. The locking gear legs 100 may be located mostly within the differential case 24; however, the end portions of the legs 100 axially extend through differential case apertures 108 dedicated to each leg 100. The end portions of the legs 100 extend outside of the differential case 24 to contact the armature 92, the spacer 94, or the sensor plate 124.

A plurality of teeth 112 are located on the axially inboard side 110 of the locking gear body portion 102. The teeth 112 extend circumferentially about the locking gear body portion inboard side 110. The locking gear teeth 112 are complementary with and selectively mesh with the second differential side gear locking teeth 76.

In an embodiment, the locking gear 96 defines an annular groove 118 located in an inboard surface thereof. The locking gear groove 118 may be axially aligned with a groove 121 on the axially outboard surface 78 of the second differential side gear 66. A biasing member 122 may be at least partially located within the locking gear groove 118 and the second differential side gear groove 121. The biasing member 122 axially biases the locking gear 96 apart from the second differential side gear 66 when the actuator assembly 80 is in a disengaged position. The biasing member 122 may be, but is not limited to, a spring, a plurality of springs, one or more Bellville-type washers, or one or more wave springs.

Being located within the differential case 24, it can be appreciated that the locking gear 96 rotates with the differential case 24. The locking gear 96 is preferably one piece, unitary and integrally formed out of a robust material, such as metal. The locking gear 96 may be constructed of a conductive material.

In an embodiment, as illustrated in FIGS. 2-4, the sensor plate 124 may be coupled with the locking gear 96. The sensor plate 124 may comprise a generally discoid geometry and have a radially inner surface 126, a radially outer surface 128, an axially inboard surface 130, and an axially outboard surface 132. The axially inboard and outboard surfaces 130, 132 may be substantially parallel and equally spaced from one another. In the embodiment illustrated in FIGS. 2-4, the axially inboard and outboard surfaces 130, 132 define a substantially constant sensor plate 124 thickness therebetween. The sensor plate 124 may have a radial dimension much greater than its axial dimension. In other words, the thickness of the plate 124 may be much less than the distance between the radially inner and outer surface 126, 128.

As illustrated in FIGS. 2-4, the sensor plate 124 may comprise tabs 134 extending axially, or transverse, to the axially inboard surface 130. A radially inner surface of the tabs 134 may be contiguous with the sensor plate radially inner surface 126. The tabs 134 may be regularly spaced from one another about the circumference of the radially inner surface 126. In an embodiment, a portion of the tabs 134 may be disposed in a radially extending annular groove 135 defined by the locking gear 96 to frictionally lock the sensor plate 124 to the locking gear 96. In one embodiment, the groove 135 is disposed in a radially inner side of the locking gear legs 100.

At least a portion of the sensor plate 124 is located substantially outside of the differential case 24; however, the sensor plate tabs 134 may extend into the differential case 24. More particularly, the tabs 134 may extend at least partially through the differential case apertures 108. In other embodiments (not depicted), the sensor plate 124 may be coupled with the locking gear 96 in other ways such as, but not limited to, mechanical fasteners. Thus, in certain embodiments, the armature 92 or the annular spacer 94 may not directly contact the sensor plate 124, but instead the armature 92 or annular spacer 94 may directly contact the locking gear 96.

Figure 6:
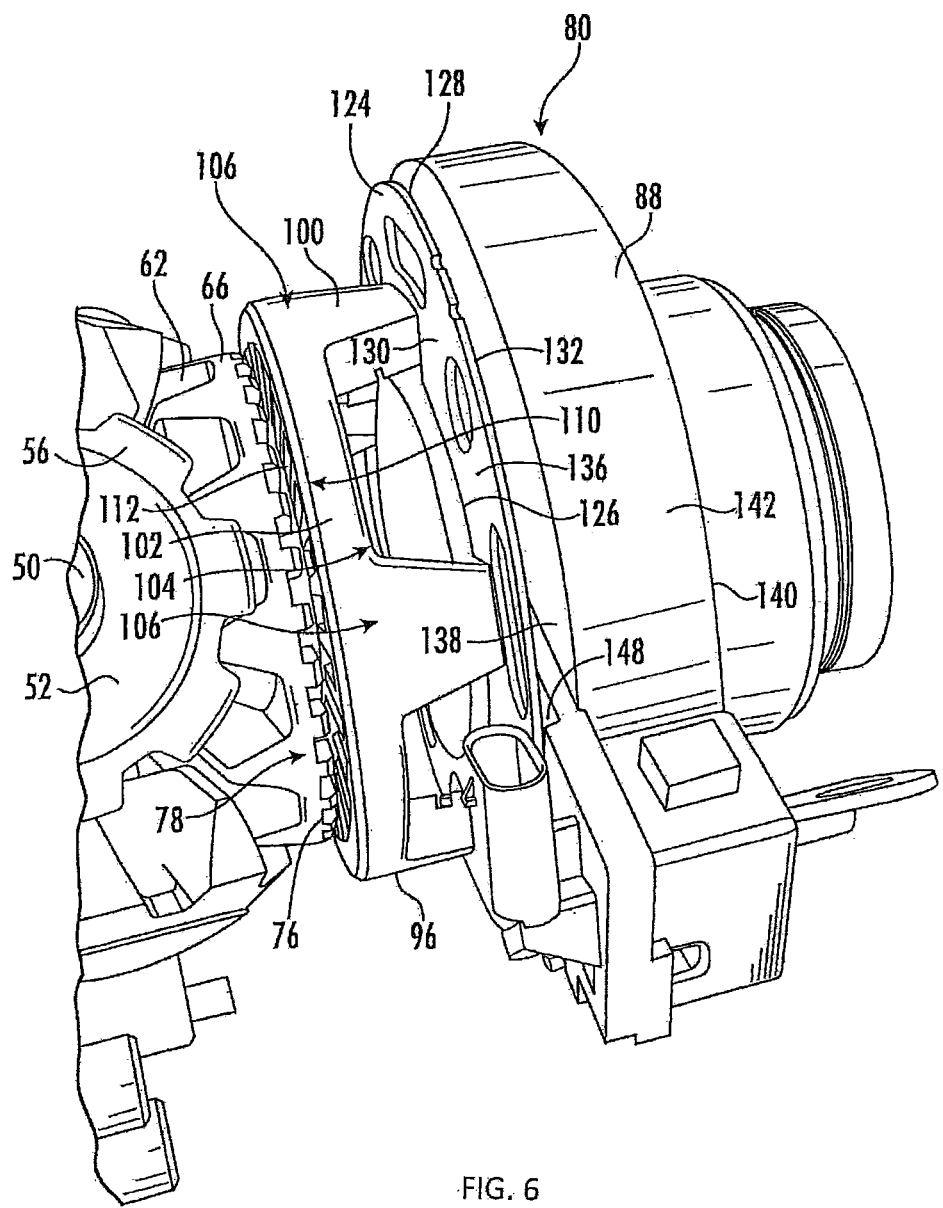
FIG. 6 is a fragmentary perspective view of a portion of the differential according to FIG. 2, wherein a differential case is not shown.

In an embodiment, a body portion 136 of the sensor plate 124 may comprise a substantially continuous surface. In another embodiment, as illustrated in FIG. 6, the sensor plate body portion 136 may have one or more apertures extending axially therethrough. The apertures may permit fluid, such as air and lubricant, to flow within the differential carrier 10. In an embodiment (not depicted), the sensor plate 124 may comprise a plurality of apertures having a small diameter, versus having fewer apertures with a relatively large diameter. The sensor plate 124, being coupled with the locking gear 96, moves axially with and rotates with the locking gear 96. Further, the sensor plate 124 may comprise a conductive material.

The housing 88 comprises an inboard surface 138, an outboard surface 140, and a radially outer surface 142. The radially outer surface 142 may be curvilinear and define a substantially constant outer diameter of the ring-shaped housing 88. The inboard and outboard surfaces 138, 140 define a substantially constant distance, or thickness, between them. The inboard and outboard surfaces 138, 140 are substantially parallel one another. The inboard and outboard surfaces 138, 140 may extend substantially transverse to an axis of rotation 144 of the differential case 24.

Similarly, the inboard and outboard surfaces 130, 132 of the sensor plate 124 may extend substantially transverse the axis of rotation 144 of the differential case 24. The inboard and outboard surfaces 130, 132 of the sensor plate 124 are substantially parallel to the inboard and outboard surfaces 138, 140 of the housing 88.

In an embodiment, a position sensor 148 of a sensor system 152 (shown in FIG. 1) may be disposed on the inboard surface 138 of the housing 88. In another embodiment, the position sensor 148 may be disposed in a recess in the inboard surface 138 of the housing 88. The position sensor 148 may be located anywhere radially along the inboard surface 138. In one embodiment, the position sensor 148 is located near a radially outward portion of the inboard surface 138. In an embodiment, more than one position sensor 148 may be located at more than one radial location on the inboard surface 138. In another embodiment, the position sensor 148 may comprise a ring disposed on the inboard surface 138.

Figure 7:
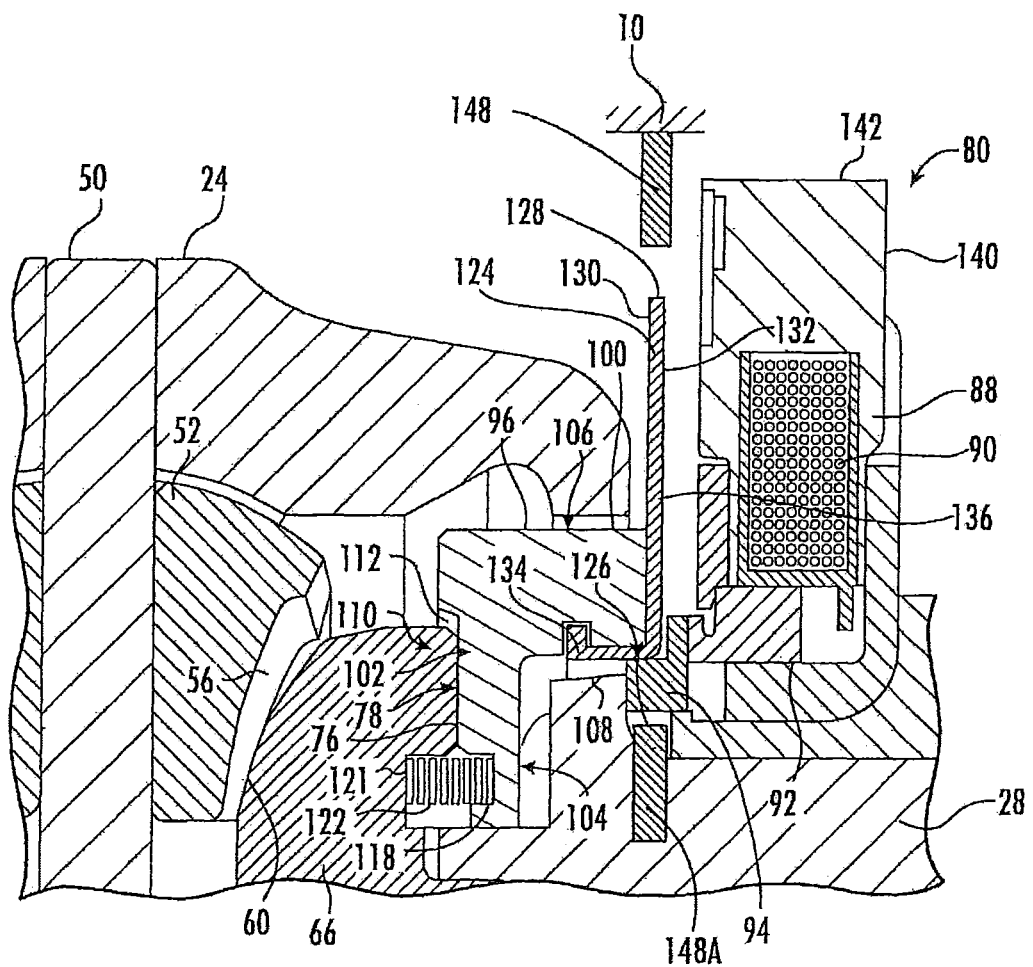
FIG. 7 is a fragmentary cross-sectional view of a portion of a differential having a transverse sensor according to an embodiment of the presently disclosed subject matter.

In yet another embodiment, as illustrated in FIG. 7, the position sensor 148 may be located transverse to the sensor plate 124. For example, the position sensor 148 may be located radially outward from the sensor plate 124. In this embodiment, the position sensor 148 is fixed a constant distance from the radially outer surface 128 of the sensor plate 124.

The transverse position sensor 148 works essentially the same as described herein. In one embodiment, the transverse position sensor 148 senses the percentage it is covered by the sensor plate radially outer surface 128 so that a microcontroller can determine the position of the sensor plate 124 based on the percentage of coverage.

In still another embodiment, as illustrated in FIG. 7, a first transverse position sensor 148 may be located radially above the sensor plate 124 and a second transverse position sensor 148A may be located radially below the sensor plate 124. By "above" and "below" is it meant that the first and second sensors are fixed radially opposite one another.

In another embodiment (not depicted), a first position sensor 148 may be located axially adjacent the sensor plate inboard surface 130 and a second position sensor 148 may be located axially adjacent the sensor plate outboard surface 132. Thus, the first and second sensors 148, 148 are located on either side of the sensor plate 124; the first position sensor 148 faces the sensor plate inboard surface 130 and the second position sensor 148 faces the sensor plate outboard surface 132. The second position sensor 148 may be radially aligned with the first sensor. In other words, the first and second sensors 148, 148 may be located the same distances from the differential axis of rotation 144. In this embodiment, the data from the first and second sensors 148, 148 may be used by the controller microprocessor either in conjunction or separately. When used separately, the data can be compared to act as a double check on the sensor plate 124 position. When used together, the data can be used to detect any variation in the distance between the sensor plate 124 and the first and second sensors 148, 148.

Various types of sensors 148 may be used. A brief summary of some of the possible sensors 148 follows, but the device is not limited to just these sensors 148 or the operation described below.

In one embodiment, the position sensor 148 may be a two-wire sensor. A voltage is provided to the position sensor 148 (for example, approximately 4-9 volts), and a draw of current is fixed. The current may be such as either 7 milliamps or 14 milliamps depending on the state of the system. For example, one current may be associated with a locked condition of the differential 23 and another current can be associated with an unlocked condition of the differential 23.

In another embodiment, the position sensor 148 may be a three-wire sensor. This embodiment may transmit an output such as a fixed frequency signal around 250 Hz, but other frequencies may be used. The duty cycle of the output may vary with the position of the sensor plate 124 or locking gear 96. The output may be either a continuous signal relative to the position of the sensor plate 124 or locking gear 96, or the output may be a signal having fixed values based on specific positions of the sensor plate 124 or locking gear 96. For example, the output may be a signal indicating 10% when the sensor plate 124 or locking gear 96 is closest to the position sensor 148, and indicating 90% when the sensor plate 124 or locking gear 96 is furthest from the position sensor 148. In addition, the output may be include percentage signals that may be fixed for specific positions at every instance between the closest and furthest positions. In yet another embodiment of this position sensor 148, the output may be a signal that may be fixed at a particular amount in the closest position (unlocked) and a different particular amount in the furthest position (locked) with no other signals.

In another embodiment, the output of the position sensor 148 may be a serial digital signal. By way of example, the output may be a serial digital signal such as a UART-style or LIN-bus output with a predetermined baud rate (such as, by way of example 9600 baud).

In any of the above-described embodiments, the position sensor 148 may be an inductive sensor comprising an inductive coil 149. The sensor inductive coil 149 may include, but is not limited to, a bobbin-wound length of wire, a printed circuit board (PCB) trace spiral, or a printed trace of metal (if the inboard surface is non-conductive). In an embodiment, the inductive coil 149 may be substantially planar and rigid. In another embodiment, the inductive coil 149 may be flexible, non-planar and/or curvilinear.

In embodiments where planar and rigid, the inductive coil 149 may be set in, or located on, a substrate. The substrate may be the housing 88, or a material attached to the housing 88 in which the position sensor 148 is embedded.

In embodiments where flexible, non-planar and curvilinear, the inductive coil 149 may similarly be set in, or located on, a substrate. The substrate may be a flexible material that can be adapted to a curvilinear surface. In one embodiment, the substrate may be a flexible circuit board. Alternatively, the inductive coil 149, in whole or in part, may be curved or flexed so that it is curvilinear. The inductive coil 149 may then be located on a curvilinear shape, such as the differential case 24 or the differential carrier 10 or a structure connected to either.

The inductive coil 149 generates a high-frequency alternating magnetic field when a conductive material is nearby. The magnetic field causes eddy currents to form within the conductive material. The eddy currents create a magnetic field in the conductive material opposite to the magnetic field in the inductive coil 149. An amplitude of the eddy currents in the conductive material measured by the position sensor 148 is proportional to a distance of the conductive material therefrom. The position sensor 148 is configured to generate and transmit the output indicative of the distance of the conductive material therefrom to a controller 150 of the sensor system 154 (shown in FIG. 1) such as a microcontroller or a controller area network (CAN) system, for example, in electrical communication with the position sensor 148. In certain embodiments, the controller 150 may be located on or within the actuator assembly housing 88. In other embodiments, however, the controller 150 may be located at other suitable locations within the vehicle 10 shown in FIG. 1 as desired.

In an embodiment, the conductive material may be the sensor plate 124. In another embodiment, the position sensor 148 instead senses the location of the locking gear 96. It can be appreciated that the position sensor 148 senses the exact position of the locking gear 96, whether position sensor 148 senses the locking gear 96 directly, or the sensor plate 124. As can be appreciated from the foregoing, the location of the locking gear 96 and/or the sensor plate 124 can be known so that a reliable determination of whether the differential 23 is in a locked or unlocked condition can also be reliably known.

FIGS. 2 and 3 illustrate the differential 23 in an unlocked state. In an unlocked state, the locking gear 96 is not engaged with the second side gear 66. Additionally, the electromagnetic coil 90 is not sufficiently energized to actuate the armature 92. Further, the biasing member 122 biases the locking gear 96 to an axially outboard position.

Upon the detection of a condition wherein it may be desirable to lock the differential 23, electrical current is supplied to the electromagnetic coil 90 in an amount sufficient for the electromagnetic coil 90 to create a magnetic flux in the electrically conductive armature 92. There may be a variety of conditions that warrant locking the differential 23. These conditions may be monitored by one or more vehicle sensors (not depicted).

The magnetic flux in the armature 92 causes the armature 92 to move in an axially inboard direction. The flux in the armature 92 is sufficient that it moves the armature 92 against the biasing force of the biasing member 122. In other words, the axial inboard movement of the armature 92 axially moves the locking gear 96 in an inboard direction. As noted above, because the sensor plate 124 is coupled with the locking gear 96, the sensor plate 124 also moves in an axial inboard direction.

FIG. 4 illustrates the differential 23 in the locked state. In the locked state, the armature 92, the locking gear 96, and the sensor plate 124, move in an axial inboard direction so that the second side gear locking teeth 76 and the locking gear teeth 112 engage with one another. When the second side gear locking teeth 76 and the locking gear teeth 112 are fully engaged the differential 23 is locked. In the locked condition, the second side gear 66 is locked against rotation relative to the differential case 24. This prevents the second side gear 66 from rotating independently from the first side gear 64; instead, the first and second side gears 64, 66 can only rotate together. The locked state of the differential 23 has the effect of dividing power equally to both the first and second side gears 64, 66, both axle half shafts, and both wheel ends.

When a locked differential 23 is no longer required, the electrical current to the electromagnetic coil 90 is ended, or reduced. The termination or reduction in power to the electromagnetic coil 90 causes the biasing member 122 to urge the locking gear 96 in the axial outboard direction from the second side gear 66. This results in the locking teeth 76 of the second side gear 66 and the teeth 112 of the locking gear 96 to disengage. Once disengaged, the second side gear 66 can rotate with respect to the first side gear 64.

As illustrated in FIG. 1, the sensor system 152 may further include a temperature sensor 154 for measuring and/or estimating a temperature T1 of a desired input location 156 (e.g. a component or fluid of the vehicle 10). It is understood that additional temperature sensors 154 may be employed for measuring temperatures at a plurality of input locations 156. By way of example, the desired input location 156 may be a location within the controller 150, a clutch assembly of a rear drive unit, the differential 23, a vehicle engine, an engine fluid, a vehicle transmission, a transmission fluid, ambient air, and the like. Various types of controllers or microcontrollers may be employed with the sensor system 152. In the embodiment shown, the sensor system 152 facilitates electrical communication amongst the position sensor 148, the controller 150, and the temperature sensor 154. In certain embodiments, the controller 150 may be in electrical communication with the position sensor 148, the controller 150, and the temperature sensor 154 to facilitate such communication there amongst.

In certain embodiments, the controller 150 includes a memory 158 for storing data. The memory 158 may be in electrical communication with the position sensor 148 and the temperature sensor 154. The memory 158 may be configured to store an offset profile of the position sensor 148 determined during development of the position sensor 148. The offset profile may be a look-up table which provides an offset value for the output (e.g. the frequency signal) of the position sensor 148 based upon a temperature.

In one embodiment, the temperature sensor 154 is thermistor. Various types of thermistors may be employed as the temperature sensor 154 such as a negative temperature coefficient (NTC) thermistor and a positive temperature coefficient (PTC) thermistor, for example. With an NTC thermistor, when the temperature increases, resistance of the NTC thermistor decreases. Conversely, when temperature decreases, resistance of the NTC thermistor increases. On the other hand with a PTC thermistor, when temperature increases, the resistance of the PTC thermistor increases, and when temperature decreases, resistance of the PTC thermistor decreases.

Unlike other temperature sensors, the temperature sensor 154 may be a nonlinear thermistor, meaning a relationship between a resistance and a temperature is not a 1:1 ratio. As such, the temperature to resistance values plotted on a graph representing such relationship form a curve rather than a straight line. It is understood that the temperature sensor 154 may have a variety of shapes and sizes such as a disk, chip, bead, rod, surface-mounted, for example. The temperature sensor 154 can also be encapsulated in epoxy resin, glass, baked-on phenolic, and painted, if desired.

In the embodiment shown, the temperature sensor 154 is employed to measure the temperature T1 of the desired input location 156. The temperature sensor 154 has a minimal amount of electrical current (also commonly referred to as a bias current) flowing therethrough. The controller 150 is configured to cause an electrical source (not depicted) such as, by way of example a battery, to transmit the electrical current to the temperature sensor 154. The temperature sensor 154 has a resistance associated with the temperature T1 of the desired input location 156. The electrical current flowing through the temperature sensor 154 converts the resistance of the temperature sensor 154 to a measured voltage difference across terminals of the temperature sensor 154. The measured voltage difference is then transmitted from the temperature sensor 154 to the controller 150. In certain embodiments, the controller 150 determines the temperature T1 of the desired input location 156 based upon at least one determination method such as using the measured voltage difference and a tolerance band or function of the temperature sensor 154 stored within the memory 158 of the controller 150, for example. A relationship between voltage and resistance is known, and may be calculated by utilizing a look-up table or other mathematical relationship therebetween. As such, in certain other embodiments, the determination method of the controller 150 utilizes the look-up table stored in the memory 158 to determine the temperature T1 of the desired input location 156 based upon the measured voltage difference of the temperature sensor 154.

Figure 8:
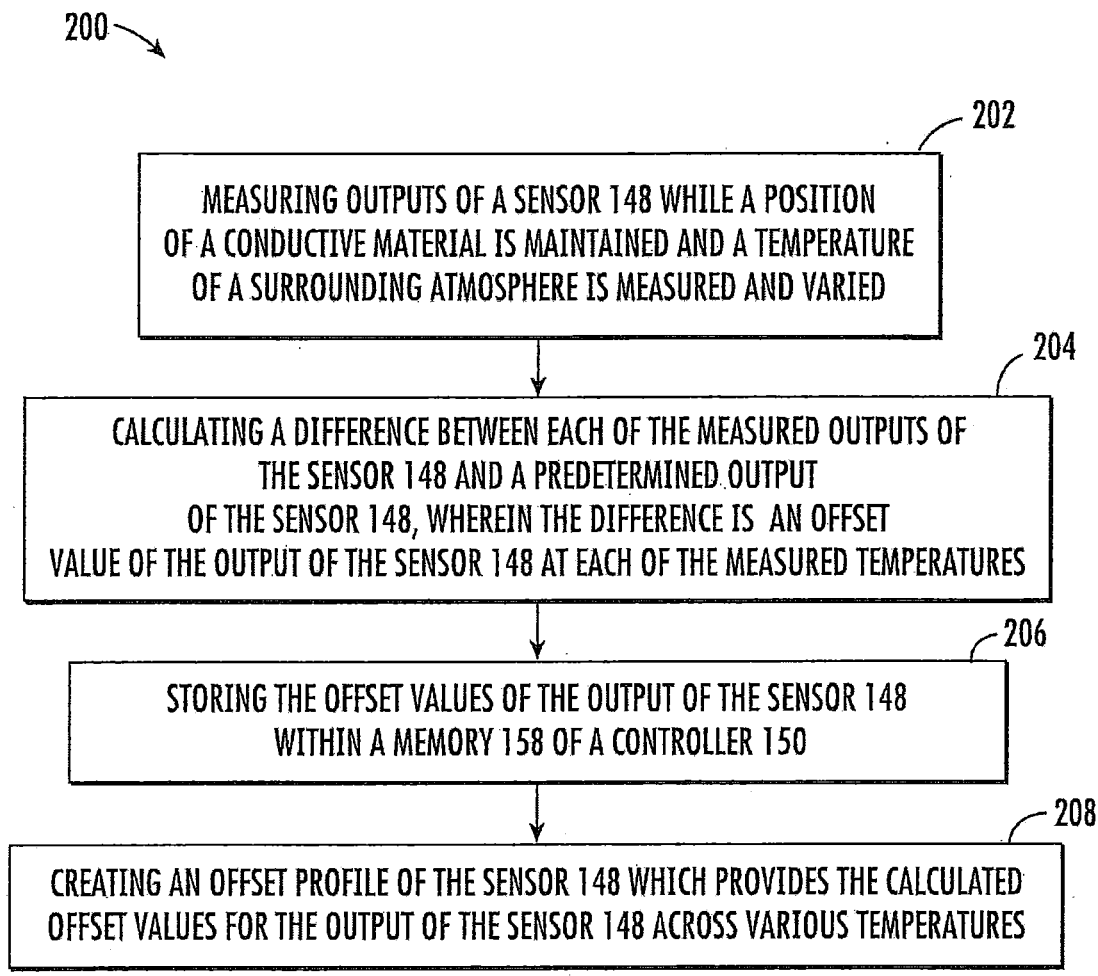
FIG. 8 is a block flow diagram of a temperature compensation method of a sensor system according to an embodiment of the presently disclosed subject matter.

Referring now to FIG. 8, a method of temperature-compensation 200 for the sensor system 152 according to an embodiment of the presently disclosed subject matter. In certain embodiments, at least one of the position sensor 148 and controller 150 is calibrated such that a value of the output of the position sensor 148 is determined to correspond with various switch points (e.g. a point of engagement of the second side gear locking teeth 76 and the locking gear teeth 112 associated with the differential 23 in the locked condition, and a point of disengagement the second side gear locking teeth 76 and the locking gear teeth 112 associated with the differential 23 in the unlocked condition) prior to operation of the vehicle 10. Such calibrated values are then stored in the memory 158 of the controller 150.

At step 202, prior to an operation of the vehicle 10, the output of the position sensor 148 is measured while a position of the conductive material is maintained and a temperature of a surrounding atmosphere is measured and varied. A difference between values of the measured output of the position sensor 148 at the measured temperatures and a predetermined output (i.e. a frequency at an ideal ambient temperature) is calculated at step 204. In certain embodiments, the difference between each of the values of the measured output of the position sensor 148 at the measured temperatures and the predetermined output is an offset value of the output of the position sensor 148 at each of the measured temperatures representative of an effect of temperature on the position sensor 148. The offset values are then stored within the memory 158 of the controller 150 at step 206. As such, at step 208, an offset profile of the position sensor 148, or a look-up table, is created which provides the calculated offset value for the output of the position sensor 148 across numerous temperatures.

Figure 9:
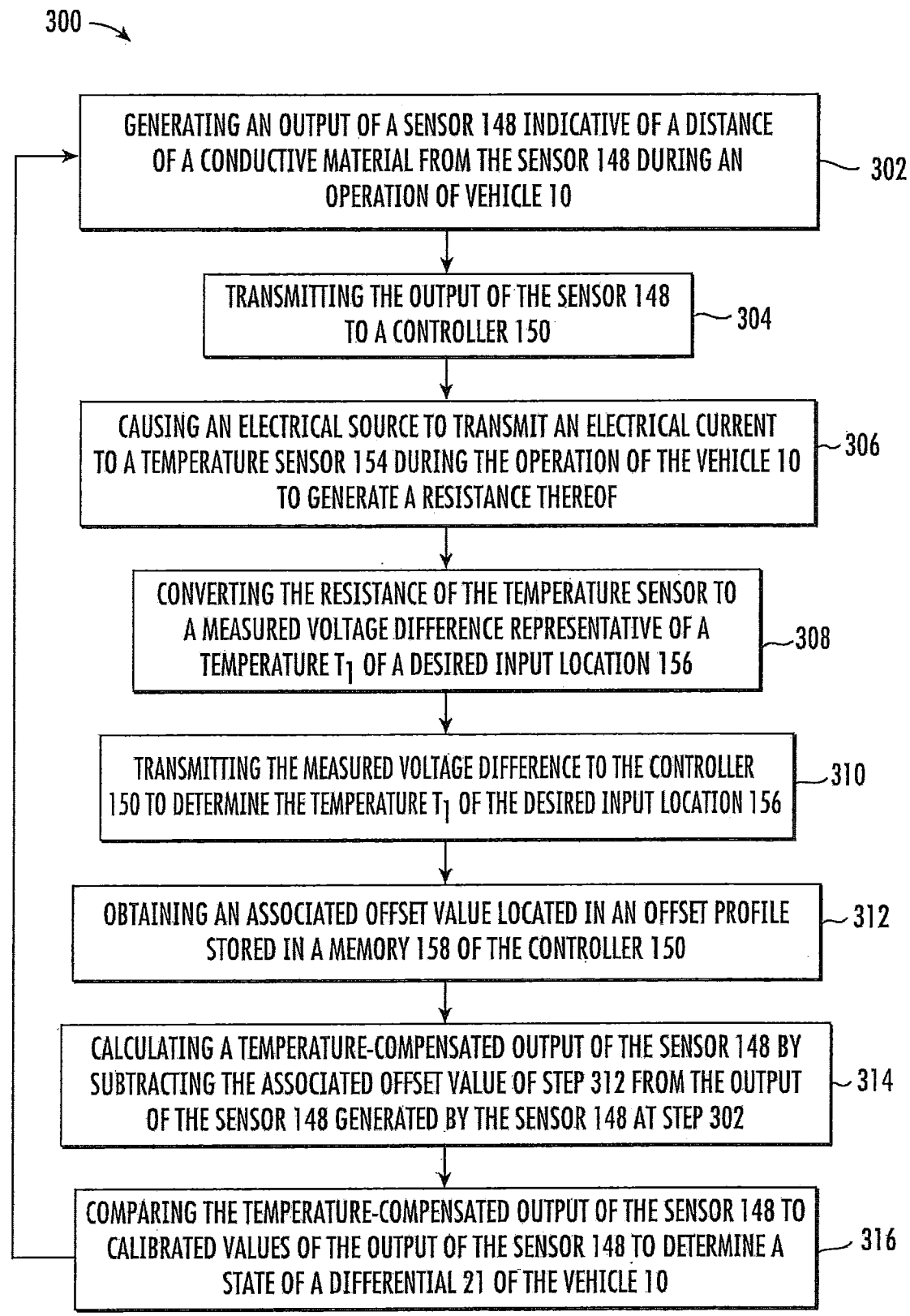
FIG. 9 is a block flow diagram of a method of sensing using the sensor system according to FIG. 8.

Referring now to FIG. 9, a method of sensing 300 of the sensor system 152 according to an embodiment of the presently disclosed subject matter. During the operation of the vehicle 10, at step 302, the position sensor 148 generates the output thereof indicative of the distance of the conductive material therefrom. At step 304, the output of the position sensor 148 is transmitted to the controller 150.

Simultaneously, at step 306, an electrical current is supplied from an electrical source (e.g. a battery) to the temperature sensor 154 and flow therethrough, which generates the resistance. At step 308, the resistance of the temperature sensor 154 is then converted to the measured voltage difference across the terminals of the temperature sensor 154 representative of the temperature T1 of the desired input location 156. At step 310, the measured voltage difference is then transmitted to the controller 150 of the sensor system 152 to determine the temperature T1 of the desired input location 156 using any suitable determination method as desired. At step 312, the temperature T1 of the desired input location 156 is used to obtain the associated offset value for the output of the position sensor 148 from the offset profile stored in the memory 158 of the controller 150. Thereafter, at step 314, a temperature-compensated output of the position sensor 148 is then calculated by subtracting the associated offset value for the output of the position sensor 148 of step 312 from the output of the position sensor 148 generated by the position sensor 148 at step 302. The temperature-compensated output of the position sensor 148 is then utilized by the controller 150 and compared to the calibrated values of the output of the position sensor 148 to determine a state of the differential 23 (i.e. the locked or unlocked condition) at step 316.

It is understood that the method of sensing 300 of the position sensor 148 may be repeated as desired. In certain embodiments, the method of sensing 300 of the position sensor 148 is continuously repeated. In other certain embodiments, however, that the method of sensing 300 of the position sensor 148 may be periodically repeated at predetermined intervals, if desired.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A sensor system, comprising:
a first sensor positioned radially outward from a sensor plate coupled to a lock ring of a differential of an axle assembly of a drive unit, the first sensor configured to generate at least one output, wherein the first sensor is an eddy current sensor, further comprising a second sensor positioned opposite the first sensor relative to the sensor plate, wherein the first sensor and the second sensor are positioned within the differential, and wherein the second sensor is a temperature sensor; and
a controller in electrical communication with the first sensor, the controller comprising a memory for storing data configured to store at least one offset value for the at least one output of the first sensor based on a temperature sensed by the second sensor.

2. The sensor system of claim 1, wherein the at least one output of the first sensor is indicative of a distance of a conductive material from the first sensor, wherein the differential comprises a differential case coupled to a ring gear, the ring gear meshed with a pinion gear coupled to a transfer case.

3. The sensor system of claim 1, wherein the at least one output of the first sensor is a frequency signal, wherein a ring gear is integrally formed with a differential case of the differential.

4. The sensor system of claim 1, wherein at least one offset value is a difference between at least one measured output of the first sensor and a predetermined output of the first sensor.

5. The sensor system of claim 4, wherein the at least one measured output of the first sensor is determined while a position of a conductive material is maintained and a temperature of surrounding atmosphere is varied.

6. The sensor system of claim 4, wherein the predetermined output of the first sensor is a frequency signal at an ideal ambient temperature.

7. The sensor system of claim 1, wherein the second sensor is in electrical communication with the controller, wherein the second sensor is configured to measure a temperature of a desired input location, wherein the differential comprises a differential case, the differential case comprising a ring gear flange coupled to a ring gear.

8. The sensor system of claim 7, wherein the second sensor is a thermistor, wherein the sensor plate is located outside of the differential case and wherein sensor plate tabs extend into the differential case.

9. A method of temperature-compensation of a sensor system, comprising the steps of:
providing a first sensor configured to generate an output, the first sensor positioned radially outward from a sensor plate coupled to a lock ring of a differential of an axle assembly of a drive unit of a vehicle, wherein the first sensor is an eddy current sensor, further comprising a second sensor positioned opposite the first sensor relative to the sensor plate, wherein the second sensor is a temperature sensor, and wherein the first sensor and the second sensor are positioned within the differential;
providing a controller in electrical communication with the first sensor, wherein the controller comprises a memory for storing data;
providing a plurality of offset values for the output of the first sensor;
transmitting the output of the first sensor to the controller; and
calculating a temperature-compensated output of the first sensor, based on an output of the second sensor, by adjusting the output of the first sensor by one of the offset values stored in the memory of the controller.

10. The method of claim 9, further comprising the step of providing the second sensor in electrical communication with the controller, wherein the second sensor is configured to measure a temperature of a desired input location, wherein the first sensor and the second sensor are located the same distance from an axis of rotation of the differential.

11. The method of claim 10, wherein the one of the offset values is obtained based upon the output of the first sensor and the measured temperature from the second sensor.

12. The method of claim 9, further comprising the step of comparing the temperature-compensated output of the first sensor to calibrated values the output of the first sensor to determine a state of the differential of the vehicle, wherein the first sensor is located radially above the sensor plate and the second sensor is located radially below the sensor plate.

13. The method of claim 9, wherein the offset values are calculated using measured outputs of the first sensor determined while a position of a conductive material is maintained and a temperature of surrounding atmosphere is varied, wherein the first sensor is located axially adjacent to an inboard surface of the sensor plate and the second sensor is located axially adjacent to an outboard surface of the sensor plate.

14. The method of claim 13, wherein each of the offset values is a difference between one of the measured outputs of the first sensor and a predetermined output of the first sensor, wherein the inboard surface and the outboard surface of the sensor plate are parallel to inboard and outboard surfaces of a differential housing and transverse to an axis of rotation of the differential.

* * * * *